Patented July 16, 1940

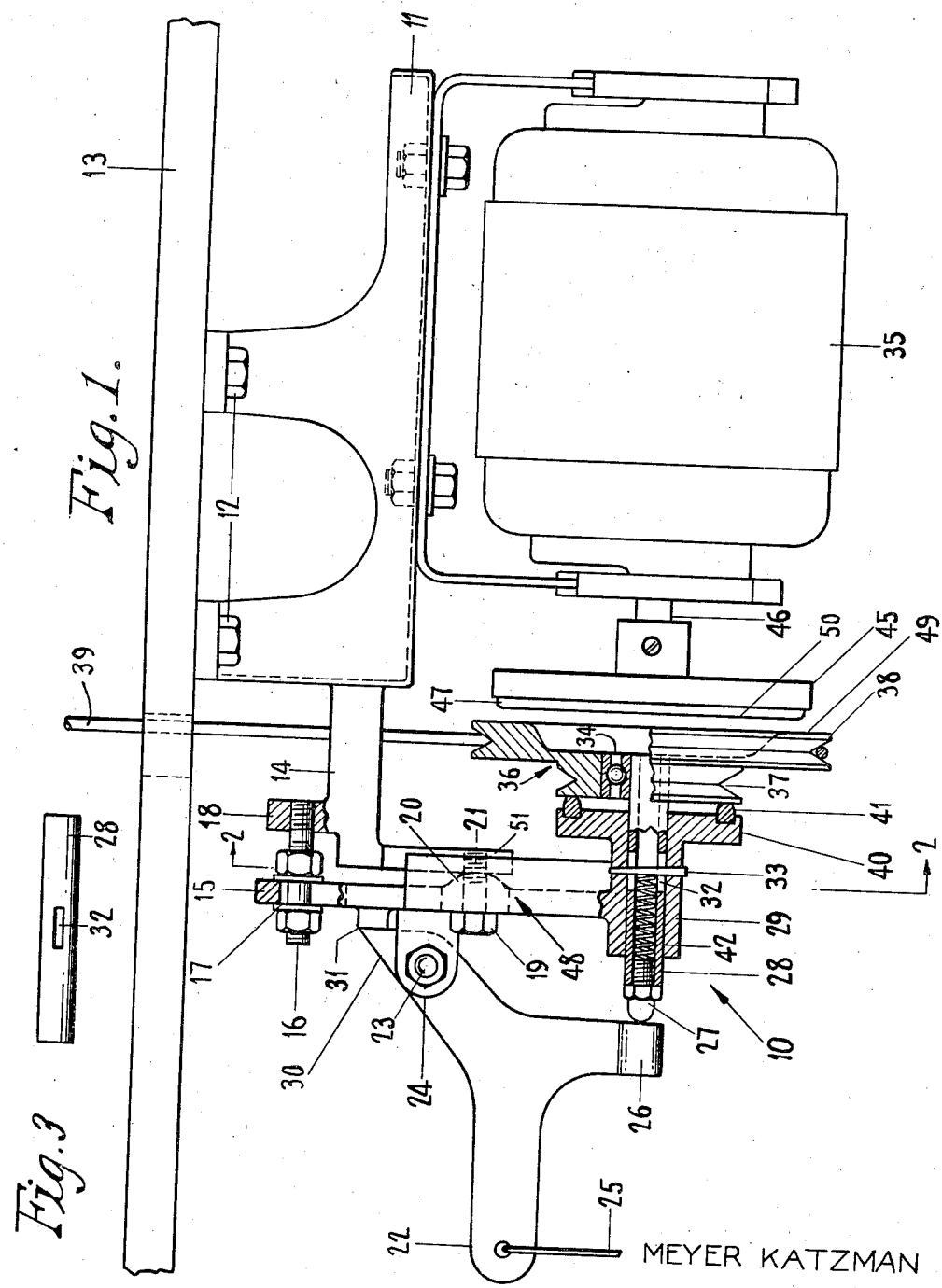

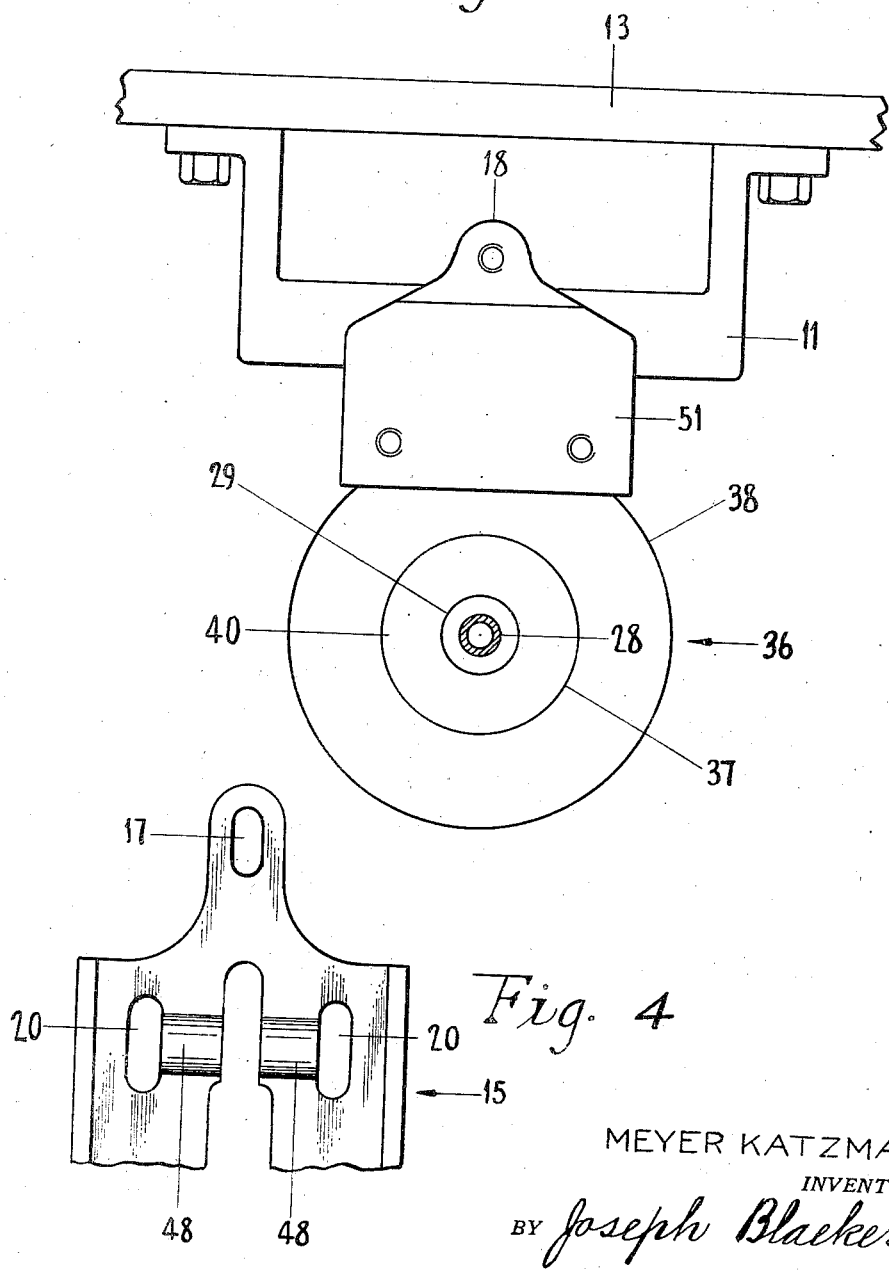

2,208,513

UNITED STATES PATENT OFFICE 2,208,513

FRICTION CLUTCH DRIVING MECHANISM

Meyer Katzman, Brooklyn, N. Y.

Application March 20, 1940, Serial No. 324,956

7 Claims. (Cl. 192—18)

This invention relates to a friction clutch driving mechanism, and particularly to motor driven power transmitters for driving sewing machines and the like.

An object of this invention is to provide means for adjusting the position of the transmission shaft of a power transmitter so that it may be easily and quickly aligned with the motor shaft.

Another object of this invention is to provide a pulley rotatably mounted on a non-rotatable sleeve, the sleeve being shiftable by manual control means to bring the pulley into engagement with a driving friction clutch disk secured to the shaft of an electric motor.

Another object of this invention is to provide a supporting bracket and a journal bracket adjustably suspended from the supporting bracket, the said journal bracket having a non-rotatable sleeve slidably mounted therein and the said sleeve being resiliently pressed in a direction to bring the pulley into frictional engagement with a brake disk on the journal bracket.

Another object of this invention is to provide improved control of the interengaging clutch members, insuring firm grippage between them the instant they are brought into engagement and preventing overrunning of the driven clutch member so that the sewing machine is stopped practically instantly upon disconnection of the said clutch members.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a front elevation of the friction clutch shown in its operative relation to an electric motor, the friction clutch being partly in vertical section and in its pulley-braking and clutch inoperative position.

Figure 2 is a view of the clutch assembly taken as on line 2—2 in Figure 1.

Figure 3 is a top view of the sleeve.

Figure 4 is a fragmentary rear view of the journal bracket.

In the illustrated embodiment of the invention, the numeral 10 indicates a friction clutch driving mechanism comprising a supporting bracket 11 which is secured by means of bolts 12 to the underside of a table 13 for supporting a sewing machine.

The supporting bracket 11 has an arm 14 to which a journal bracket 15 is attached by means of a screw bolt 16 extending through an elongated opening 17 in the upper portion of the journal bracket 15 and screwed into a threaded upper extension 18 of the arm 14.

The journal bracket 15 has also been secured to the supporting bracket 11 by means of two spaced screw bolts 19 extending through elongated openings 20 in the body portion of the journal bracket 15 and screwed into threaded holes 21 in a vertical extension of the arm 14.

An operating lever 22 has been pivoted at 23 between a pair of lugs 24 and is actuated through the medium of a link 25 connected to a treadle (not shown). The lever 22 has been formed at its lower end with a boss 26 which is positioned in alignment with an adjustable contact member 27 threadably secured in a sleeve 28. The sleeve 28 has been slidably mounted in a journal bearing 29 at the lower end of the journal bracket 15. The upper end 30 of the lever 22 normally contacts a boss 31 extending from the bracket 15.

The sleeve 28 has an elongated slot 32 extending therethrough. A taper pin 33 fixed in the journal bearing 29 extends through the slot 32 and prevents rotation of the sleeve 28.

A ball bearing 34 has been mounted on the end of the sleeve facing an electric motor 35 and supports a pulley 36. The pulley is thus rotatably mounted on the non-rotatable sleeve.

The pulley 36 comprises a member 37 of small diameter and a member 38 of large diameter. Either of the said pulley members may cooperate with a belt 39 for driving a pulley of a sewing machine (not shown) supported on the table 13. The different sizes of pulley diameters permit the transmission of power at correspondingly different speeds.

The journal bracket 15 has an integral brake disk 40 facing the motor 35. The disk 40 carries a friction transmission ring 41, preferably made of leather.

A coil spring 42 has been placed inside the sleeve 28 and has one of its ends in abutment with the taper pin 33. The spring presses at its opposite end against an end face of the contact member 27 and forces the sleeve 28 and the pulley 36 in a direction away from a friction drive disk 45 secured to the motor shaft 46. The disk 45 has a friction ring 47 therein and facing the pulley 36.

When the operator desires to transmit power by means of the belt 39, he lowers the link 25 and causes the lever 22 to move the sleeve 28 toward the drive disk 45. This causes the outer bearing face of the pulley 36 to come into frictional engagement with the friction transmission ring 47. The rotary movement of the driving disk 45 is transmitted to the pulley 36, to the belt 39 and to the sewing machine pulley connected therewith. When the pull downward on the link is released, the clutch parts are instantly brought back to their normal inoperative positions by the action of the spring 42.

It is very important to have the sleeve 28 maintained in proper alignment with the axis of the motor shaft 46 so as to enable the contacting surfaces of the friction ring 47 and the pulley 36 to be parallel to each other. To assure this alignment, the operator raises or lowers the journal bracket 15 to locate the axis of the sleeve 28 in line with the axis of the motor shaft 46. The operator simultaneously positions the journal bracket at the required angle by means of angular projections 48, 48, on the journal bracket 15 so that the bearing face 49 of the pulley 36 evenly bears against the bearing face 50 of the friction ring 47 and then the bolts 16 and 19 are screwed up to tightly clamp the journal bracket 15 to the vertical extension 18 and body portion 51 of the supporting bracket 11.

It is to be noted that the three screw bolts 16, 19, 19, provide what may be termed a three-point suspension, for the adjustable journal bracket, the three points being in a triangular position.

It is also to be noted that the annular friction transmission ring 41 seating against a disk surface provides a far greater area of contact between the braking members which provide more positive stopping means than the usual elongated brake block which makes substantially point contact.

In accordance with the patent statutes I have described and illustrated the preferred embodiment of my invention, but it will be understood that various changes and modifications can be made therein without departing from the spirit of the invention as defined by the appended claims.

I claim:

1. In a friction clutch driving mechanism, the combination of a supporting bracket, a journal bracket having a brake disk and a friction ring supported therein, means to suspend the journal bracket from said supporting bracket, a non-rotatable sleeve slidably mounted within said journal bracket, a pulley having parallel bearing faces and being rotatably mounted on said sleeve, an electric motor with its shaft normally in alignment with said sleeve, a drive disk fastened to said motor shaft, a friction ring supported in said drive disk co-acting with a bearing face of said pulley, manual control means for shifting said pulley into engagement with said drive disk, a spring interiorly of said sleeve, said spring being in abutment at one end with a member extending diametrically of said journal, said spring being adapted at its opposite end to force said sleeve in a direction away from said drive disk, whereby said pulley is brought into engagement with said friction ring in said brake disk and is brought to rest.

2. In a friction clutch driving mechanism, the combination of a supporting bracket, a journal bracket having a brake disk and a friction ring supported therein, means to suspend said journal bracket from said supporting bracket, a non-rotatable sleeve slidably mounted within said journal bracket, a pulley having parallel faces and being rotatably mounted on said sleeve, an electric motor with its shaft normally in alignment with said sleeve, said sleeve having a slot therethrough, a drive disk fastened to said motor shaft, a friction ring supported in said drive disk co-acting with a face of said pulley, manual control means for shifting said pulley into engagement with said drive disk, a spring interiorly of said sleeve and being in abutment at one end with a member fixed to said journal and extending through said slot, said spring being adapted at its opposite end to force said sleeve and said pulley in a direction away from said drive disk, whereby said pulley is brought into engagement with said friction ring in said brake disk and is brought to rest.

3. In a friction clutch driving mechanism, the combination of a supporting bracket, a journal bracket having a brake disk and a friction ring supported therein, means to suspend said journal bracket from said supporting bracket, a non-rotatable sleeve slidably mounted within said journal bracket, a pulley having parallel faces and being rotatably mounted on said sleeve, said sleeve having a slot therethrough, an electric motor with its shaft normally in alignment with said sleeve, a drive disk fastened to said motor shaft, a friction ring supported in said drive disk co-acting with a face of said pulley, manual control means for shifting said pulley into engagement with said drive disk, a spring interiorly of said sleeve and being in abutment at one end with a member fixed to said journal and extending through said slot, said spring being adapted at its opposite end to force said sleeve and said pulley in a direction away from said drive disk whereby said pulley is brought into engagement with said friction ring in said brake disk and is brought to rest, and means co-acting with said brackets for aligning said pulley with said drive disk.

4. In a friction clutch driving mechanism, the combination of a supporting bracket, a journal bracket having a brake disk and a friction ring supported therein, means to suspend said journal bracket from said supporting bracket, a non-rotatable sleeve slidably mounted within said journal bracket, a ball bearing supported by said sleeve, a pulley having parallel faces and being supported by said ball bearing and thereby being rotatably mounted on said sleeve, said sleeve having a slot therethrough, an electric motor with its shaft normally in alignment with said sleeve, a drive disk fastened to said motor shaft, a friction ring supported in said drive disk co-acting with a face of said pulley, manual control means for shifting said pulley into engagement with said drive disk, a spring interiorly of said sleeve and being in abutment at one end with a member fixed to said journal and extending through said slot, said spring being adapted at its opposite end to force said sleeve and said pulley in a direction away from said drive disk whereby said pulley is brought into engagement with said friction ring in said brake disk and is brought to rest, and means co-acting with said brackets for aligning said pulley with said drive disk.

5. In a friction clutch driving mechanism, the combination of a supporting bracket, a journal bracket having a friction brake disk, means to suspend said journal bracket from said supporting bracket, a non-rotatable sleeve slidably mounted within said journal bracket, a ball bearing supported by said sleeve, a pulley having parallel faces and being supported by said ball bearing and thereby being rotatably mounted on said sleeve, said sleeve having a slot therethrough, an electric motor supported by said supporting bracket with its shaft normally in alignment with said sleeve, a friction drive disk fastened to said motor shaft and co-acting with a face of said pulley, manual control means for shifting said pulley into engagement with said friction drive disk, a spring interiorly of said sleeve and being in abutment at one end with a member fixed to said journal and extending through said slot, said spring being adapted at its opposite end to force said sleeve and said pulley in a direction away from said friction drive disk whereby said pulley is brought into engagement with said friction brake disk and is brought to rest, and means co-acting with said brackets for aligning said pulley with said friction drive disk.

6. In a friction clutch driving mechanism, the combination of a supporting bracket, a journal bracket having a friction brake disk, means to suspend said journal bracket from said supporting bracket, a non-rotatable sleeve slidably mounted within said journal bracket, a ball bearing supported by said sleeve, a pulley having parallel faces and being supported by said ball bearing and thereby being rotatably mounted on said sleeve, said sleeve having a slot therethrough, an electric motor supported by said supporting bracket with its shaft normally in alignment with said sleeve, a friction drive disk fastened to said motor shaft and co-acting with a face of said pulley, manual control means for shifting said pulley into engagement with said friction drive disk, a spring interiorly of said sleeve and being in abutment at one end with a member fixed to said journal and extending through said slot, said spring being adapted at its opposite end to force said sleeve and said pulley in a direction away from said friction drive disk whereby said pulley is brought into engagement with said friction brake disk and is brought to rest, and a three-point suspension means co-acting with said brackets for aligning said pulley with said friction drive disk, said points being in a triangular position.

7. In a friction clutch driving mechanism, the combination of a supporting bracket, a journal bracket having a friction brake disk, means to suspend said journal bracket from said supporting bracket, a non-rotatable sleeve slidably mounted within said journal bracket, a ball bearing supported by said sleeve, a pulley having parallel friction faces and being supported by said ball bearing and thereby being rotatably mounted on said sleeve, said sleeve having a slot therethrough, an electric motor supported by said supporting bracket with its shaft normally in alignment with said sleeve, a friction drive disk fastened to said motor shaft and co-acting with a face of said pulley, manual control means for shifting said pulley into engagement with said friction drive disk, a spring interiorly of said sleeve and being in abutment at one end with a member fixed to said journal and extending through said slot and being fixed in said journal, said spring being adapted at its opposite end to force said sleeve and said pulley in a direction away from said friction drive disk whereby said pulley is brought into engagement with said friction brake disk and is brought to rest, and triangularly supported means co-acting with said brackets for aligning said pulley with said friction drive disk.

MEYER KATZMAN.